United States Patent
Stockett et al.

(10) Patent No.: US 10,850,445 B2
(45) Date of Patent: Dec. 1, 2020

(54) ADDITIVE MANUFACTURING SYSTEM CONFIGURED FOR SHEET-PRINTING COMPOSITE MATERIAL

(71) Applicant: CC3D LLC, Coeur d'Alene, ID (US)

(72) Inventors: Ryan C. Stockett, Lebanon, NH (US); Kenneth L. Tyler, Coeur d'Alene, ID (US)

(73) Assignee: Continuous Composites Inc., Coeur d'Alene, ID (US)

( * ) Notice: Subject to any disclaimer, the term of this patent is extended or adjusted under 35 U.S.C. 154(b) by 308 days.

(21) Appl. No.: 15/865,094

(22) Filed: Jan. 8, 2018

(65) Prior Publication Data

US 2018/0207850 A1  Jul. 26, 2018

Related U.S. Application Data

(60) Provisional application No. 62/449,899, filed on Jan. 24, 2017.

(51) Int. Cl.
*B29C 64/165* (2017.01)
*B29C 64/135* (2017.01)
(Continued)

(52) U.S. Cl.
CPC ............ *B29C 64/165* (2017.08); *B29C 48/08* (2019.02); *B29C 48/30* (2019.02); *B29C 48/305* (2019.02); *B29C 48/35* (2019.02); *B29C 64/106* (2017.08); *B29C 64/118* (2017.08); *B29C 64/124* (2017.08); *B29C 64/129* (2017.08); *B29C 64/135* (2017.08); *B29C 64/209* (2017.08);
(Continued)

(58) Field of Classification Search
None
See application file for complete search history.

(56) References Cited

U.S. PATENT DOCUMENTS 3,238,084 A * 3/1966 Hawkins ............... B29B 15/125
156/544
3,286,305 A  11/1966 Seckel
(Continued)

FOREIGN PATENT DOCUMENTS

DE  4102257 A1   7/1992
EP  2803475 A1 * 11/2014 ........... B29C 70/382
(Continued)

OTHER PUBLICATIONS

"Subaerial." Merriam-Webster.com Dictionary, Merriam-Webster, https://www.merriam-webster.com/dictionary/subaerial. Accessed Feb. 15, 2020. (Year: 2020).*

(Continued)

*Primary Examiner* — Seyed Masoud Malekzadeh
*Assistant Examiner* — Manley L Cummins, IV
(74) *Attorney, Agent, or Firm* — Ryan C. Stockett

(57) ABSTRACT

A head is disclosed for use with an additive manufacturing system. The head may include a housing, and a matrix reservoir disposed inside of the housing. The head may also include at least one roller located inside of the housing and configured to engage at least one of a ribbon and a sheet of reinforcement passing through the head. The head may further include a nozzle fluidly connected to the matrix reservoir, and a cure enhancer located outside of the housing and adjacent the nozzle.

19 Claims, 4 Drawing Sheets

(51) Int. Cl.

| | | |
|---|---|---|
| *B29C 64/209* | (2017.01) | |
| *B33Y 10/00* | (2015.01) | |
| *B33Y 30/00* | (2015.01) | |
| *B29C 64/371* | (2017.01) | |
| *B29C 48/08* | (2019.01) | |
| *B29C 48/30* | (2019.01) | |
| *B29C 48/35* | (2019.01) | |
| *B29C 48/305* | (2019.01) | |
| *B29C 64/245* | (2017.01) | |
| *B29C 64/124* | (2017.01) | |
| *B29C 70/24* | (2006.01) | |
| *B29C 70/38* | (2006.01) | |
| *B29C 64/129* | (2017.01) | |
| *B29C 70/68* | (2006.01) | |
| *B33Y 50/02* | (2015.01) | |
| *B33Y 70/00* | (2020.01) | |
| *B29C 64/214* | (2017.01) | |
| *B29C 64/264* | (2017.01) | |
| *B29C 64/118* | (2017.01) | |
| *B29C 64/393* | (2017.01) | |
| *B29C 64/106* | (2017.01) | |
| *B29C 64/336* | (2017.01) | |
| *B29C 70/06* | (2006.01) | |
| *B29C 64/218* | (2017.01) | |
| *B29K 105/10* | (2006.01) | |
| *B29K 105/00* | (2006.01) | |
| *B22F 7/06* | (2006.01) | |
| *B22F 3/00* | (2006.01) | |
| *B33Y 80/00* | (2015.01) | |
| *B22F 3/10* | (2006.01) | |
| *B22F 3/11* | (2006.01) | |
| *B29C 64/227* | (2017.01) | |
| *B29K 105/08* | (2006.01) | |
| *B33Y 40/00* | (2020.01) | |
| *B29B 15/12* | (2006.01) | |

(52) U.S. Cl.
CPC .......... *B29C 64/214* (2017.08); *B29C 64/218* (2017.08); *B29C 64/245* (2017.08); *B29C 64/264* (2017.08); *B29C 64/336* (2017.08); *B29C 64/371* (2017.08); *B29C 64/393* (2017.08); *B29C 70/06* (2013.01); *B29C 70/24* (2013.01); *B29C 70/382* (2013.01); *B29C 70/384* (2013.01); *B29C 70/683* (2013.01); *B33Y 10/00* (2014.12); *B33Y 30/00* (2014.12); *B33Y 50/02* (2014.12); *B33Y 70/00* (2014.12); *B22F 3/008* (2013.01); *B22F 3/1035* (2013.01); *B22F 3/1118* (2013.01); *B22F 7/06* (2013.01); *B22F 2999/00* (2013.01); *B29B 15/122* (2013.01); *B29C 64/227* (2017.08); *B29K 2105/0058* (2013.01); *B29K 2105/08* (2013.01); *B29K 2105/101* (2013.01); *B33Y 40/00* (2014.12); *B33Y 80/00* (2014.12)

(56) References Cited

U.S. PATENT DOCUMENTS

| | | | |
|---|---|---|---|
| 3,809,514 A | 5/1974 | Nunez | |
| 3,984,271 A | 10/1976 | Gilbu | |
| 3,993,726 A | 11/1976 | Moyer | |
| 4,643,940 A | 2/1987 | Shaw et al. | |
| 4,671,761 A | 6/1987 | Adrian et al. | |
| 4,822,548 A | 4/1989 | Hempel | |
| 4,851,065 A | 7/1989 | Curtz | |
| 5,002,712 A | 3/1991 | Goldmann et al. | |
| 5,037,691 A | 8/1991 | Medney et al. | |
| 5,078,821 A * | 1/1992 | Garvey | B29C 70/386 |
| | | | 156/272.2 |
| 5,296,335 A | 3/1994 | Thomas et al. | |
| 5,340,433 A | 8/1994 | Crump | |
| 5,746,967 A * | 5/1998 | Hoy | B29C 35/0888 |
| | | | 264/102 |
| 5,866,058 A | 2/1999 | Batchelder et al. | |
| 5,936,861 A | 8/1999 | Jang et al. | |
| 6,153,034 A | 11/2000 | Lipsker | |
| 6,350,071 B1 | 2/2002 | Conwell et al. | |
| 6,459,069 B1 | 10/2002 | Rabinovich | |
| 6,501,554 B1 | 12/2002 | Hackney et al. | |
| 6,799,081 B1 | 9/2004 | Hale et al. | |
| 6,803,003 B2 | 10/2004 | Rigali et al. | |
| 6,934,600 B2 | 8/2005 | Jang et al. | |
| 7,029,621 B2 | 4/2006 | Schroeder | |
| 7,039,485 B2 | 5/2006 | Engelbart et al. | |
| 7,555,404 B2 | 6/2009 | Brennan et al. | |
| 7,795,349 B2 | 9/2010 | Bredt et al. | |
| 8,221,669 B2 | 7/2012 | Batchelder et al. | |
| 8,962,717 B2 | 2/2015 | Roth et al. | |
| 9,126,365 B1 | 9/2015 | Mark et al. | |
| 9,126,367 B1 | 9/2015 | Mark et al. | |
| 9,149,988 B2 | 10/2015 | Mark et al. | |
| 9,156,205 B2 | 10/2015 | Mark et al. | |
| 9,186,846 B1 | 11/2015 | Mark et al. | |
| 9,186,848 B2 | 11/2015 | Mark et al. | |
| 9,327,452 B2 | 5/2016 | Mark et al. | |
| 9,327,453 B2 | 5/2016 | Mark et al. | |
| 9,370,896 B2 | 6/2016 | Mark | |
| 9,381,702 B2 | 7/2016 | Hollander | |
| 9,457,521 B2 | 10/2016 | Johnston et al. | |
| 9,458,955 B2 | 10/2016 | Hammer et al. | |
| 9,527,248 B2 | 12/2016 | Hollander | |
| 9,539,762 B2 | 1/2017 | Durand et al. | |
| 9,579,851 B2 | 2/2017 | Mark et al. | |
| 9,688,028 B2 | 6/2017 | Mark et al. | |
| 9,694,544 B2 | 7/2017 | Mark et al. | |
| 9,764,378 B2 | 9/2017 | Peters et al. | |
| 9,770,876 B2 | 9/2017 | Farmer et al. | |
| 9,782,926 B2 | 10/2017 | Volker | |
| 2002/0009935 A1 | 1/2002 | Hsiao et al. | |
| 2002/0062909 A1 | 5/2002 | Jang et al. | |
| 2002/0113331 A1 | 8/2002 | Zhang et al. | |
| 2002/0165304 A1 | 11/2002 | Mulligan et al. | |
| 2003/0044539 A1 | 3/2003 | Oswald | |
| 2003/0056870 A1 | 3/2003 | Comb et al. | |
| 2003/0160970 A1 | 8/2003 | Basu et al. | |
| 2003/0186042 A1 | 10/2003 | Dunlap et al. | |
| 2003/0236588 A1 | 12/2003 | Jang et al. | |
| 2005/0006803 A1 | 1/2005 | Owens | |
| 2005/0061422 A1 | 3/2005 | Martin | |
| 2005/0104257 A1 | 5/2005 | Gu et al. | |
| 2005/0109451 A1 | 5/2005 | Hauber et al. | |
| 2005/0230029 A1 | 10/2005 | Vaidyanathan et al. | |
| 2006/0180264 A1 * | 8/2006 | Kisch | B29C 70/32 |
| | | | 156/173 |
| 2006/0220278 A1 * | 10/2006 | Nakamura | B29C 43/305 |
| | | | 264/494 |
| 2007/0003650 A1 | 1/2007 | Schroeder | |
| 2007/0228592 A1 | 10/2007 | Dunn et al. | |
| 2008/0176092 A1 | 7/2008 | Owens | |
| 2009/0095410 A1 | 4/2009 | Oldani | |
| 2009/0229760 A1 * | 9/2009 | Hamlyn | B29C 70/384 |
| | | | 156/433 |
| 2011/0032301 A1 | 2/2011 | Fienup et al. | |
| 2011/0088841 A1 | 4/2011 | Thunhorst et al. | |
| 2011/0117231 A1 | 5/2011 | Klockow et al. | |
| 2011/0143108 A1 | 6/2011 | Fruth et al. | |
| 2012/0060468 A1 | 3/2012 | Dushku et al. | |
| 2012/0073726 A1 | 3/2012 | Koeniger et al. | |
| 2012/0159785 A1 | 6/2012 | Pyles et al. | |
| 2012/0222810 A1 * | 9/2012 | Vaniglia | B29C 70/384 |
| | | | 156/306.3 |
| 2012/0231225 A1 | 9/2012 | Mikulak et al. | |
| 2012/0247655 A1 | 10/2012 | Erb et al. | |
| 2013/0164498 A1 | 6/2013 | Langone et al. | |
| 2013/0209600 A1 | 8/2013 | Tow | |
| 2013/0233471 A1 | 9/2013 | Kappesser et al. | |

(56) References Cited

U.S. PATENT DOCUMENTS

| | | |
|---|---|---|
| 2013/0292039 A1 | 11/2013 | Peters et al. |
| 2013/0337256 A1 | 12/2013 | Farmer et al. |
| 2013/0337265 A1 | 12/2013 | Farmer |
| 2014/0034214 A1 | 2/2014 | Boyer et al. |
| 2014/0061974 A1 | 3/2014 | Tyler |
| 2014/0159284 A1 | 6/2014 | Leavitt |
| 2014/0232035 A1 | 8/2014 | Bheda |
| 2014/0268604 A1 | 9/2014 | Wicker et al. |
| 2014/0291886 A1 | 10/2014 | Mark et al. |
| 2015/0136455 A1 | 5/2015 | Fleming |
| 2015/0314522 A1 | 11/2015 | Witzel et al. |
| 2015/0367576 A1 | 12/2015 | Page |
| 2016/0012935 A1 | 1/2016 | Rothfuss |
| 2016/0031155 A1 | 2/2016 | Tyler |
| 2016/0046082 A1 | 2/2016 | Fuerstenberg |
| 2016/0052208 A1 | 2/2016 | Debora et al. |
| 2016/0082641 A1 | 3/2016 | Bogucki et al. |
| 2016/0082659 A1 | 3/2016 | Hickman et al. |
| 2016/0107379 A1 | 4/2016 | Mark et al. |
| 2016/0114532 A1* | 4/2016 | Schirtzinger ........... B29C 70/30 428/411.1 |
| 2016/0136885 A1 | 5/2016 | Nielsen-Cole et al. |
| 2016/0144565 A1 | 5/2016 | Mark et al. |
| 2016/0144566 A1 | 5/2016 | Mark et al. |
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0106594 A1* | 4/2017 | Gardiner ............... B29C 70/541 |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |
| 2018/0017499 A1* | 1/2018 | Monchalin ......... G01N 21/8422 |

FOREIGN PATENT DOCUMENTS

| | | |
|---|---|---|
| EP | 2803475 A1 | 11/2014 |
| EP | 2589481 B1 | 1/2016 |
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2016199038 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

International Search Report dated Mar. 28, 2018 for PCT/US18/13047 to CC3D LLC Filed Jan. 10, 2018.

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).

A. Endruweit, M. S. Johnson, & A. C. Long, Curing of Composite Components by Ultraviolet Radiation: A Review, Polymer Composites, pp. 119-128 (Apr. 2006).

(56) References Cited

OTHER PUBLICATIONS

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

\* cited by examiner

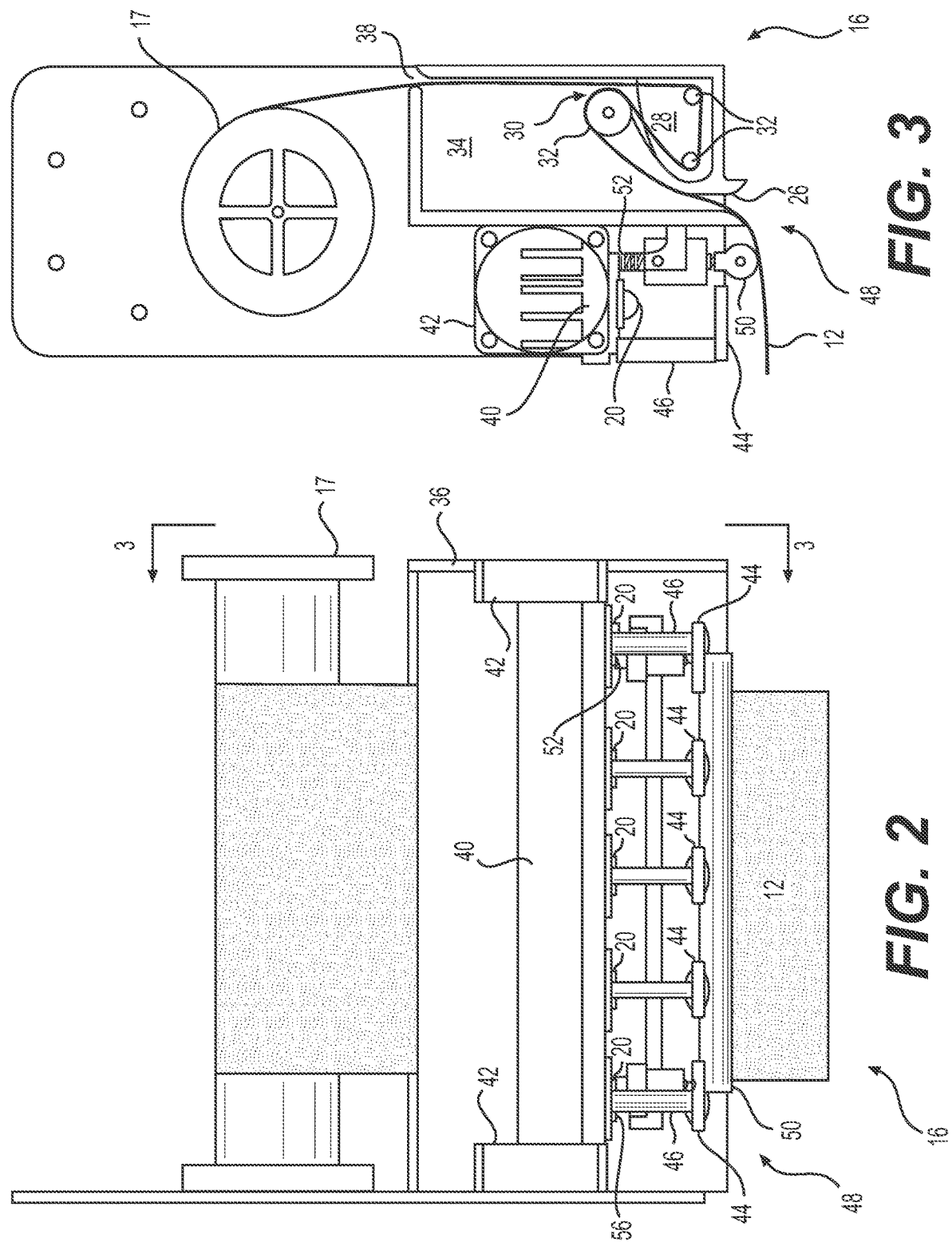

ADDITIVE MANUFACTURING SYSTEM CONFIGURED FOR SHEET-PRINTING COMPOSITE MATERIAL

RELATED APPLICATIONS

This application is based on and claims the benefit of priority from U.S. Provisional Application No. 62/449,899 that was filed on Jan. 24, 2017, the contents of which are expressly incorporated herein by reference.

TECHNICAL FIELD

The present disclosure relates generally to a manufacturing system and, more particularly, to an additive manufacturing system that is configured for printing sheets of composite material.

BACKGROUND

Extrusion manufacturing is a known process for producing continuous structures. During extrusion manufacturing, a liquid matrix (e.g., a thermoset resin or a heated thermoplastic) is pushed through a die having a desired cross-sectional shape and size. The material, upon exiting the die, cures and hardens into a final form. In some applications, UV light and/or ultrasonic vibrations are used to speed the cure of the liquid matrix as it exits the die. The structures produced by the extrusion manufacturing process can have any continuous length, with a straight or curved profile, a consistent cross-sectional shape, and excellent surface finish. Although extrusion manufacturing can be an efficient way to continuously manufacture structures, the resulting structures may lack the strength required for some applications.

Pultrusion manufacturing is a known process for producing high-strength structures. During pultrusion manufacturing, individual fiber strands, braids of strands, and/or woven fabrics are coated with or otherwise impregnated with a liquid matrix (e.g., a thermoset resin or a heated thermoplastic) and pulled through a stationary die where the liquid matrix cures and hardens into a final form. As with extrusion manufacturing, UV light and/or ultrasonic vibrations are used in some pultrusion applications to speed the cure of the liquid matrix as it exits the die. The structures produced by the pultrusion manufacturing process have many of the same attributes of extruded structures, as well as increased strength due to the integrated fibers. Although pultrusion manufacturing can be an efficient way to continuously manufacture high-strength structures, the resulting structures may lack the form (shape, size, and/or precision) and/or diversity required for some applications. In addition, during conventional multi-fiber pultrusion, a speed of fabricating complex structures may be prohibitively slow.

The disclosed system is directed at addressing one or more of the problems set forth above and/or other problems of the prior art.

SUMMARY

In one aspect, the present disclosure is directed to a head for an additive manufacturing system. The head may include a a housing, and a matrix reservoir disposed inside of the housing. The head may also include at least one roller located inside of the housing and configured to engage at least one of a ribbon and a sheet of reinforcement passing through the head. The head may further include a nozzle fluidly connected to the matrix reservoir, and a cure enhancer located outside of the housing and adjacent the nozzle.

In another aspect, the present disclosure is directed to an additive manufacturing system. The additive manufacturing system may include a moveable support, a matrix reservoir connected to an end of the moveable support, and at least one roller associated with the matrix reservoir. The additive manufacturing system may also include a nozzle fluidly connected to the matrix reservoir, a cure enhancer located adjacent the nozzle, and a controller in communication with the moveable support and the cure enhancer. The controller may be configured to cause at least one of a ribbon and a sheet of reinforcement to be wetted with matrix from the matrix reservoir, to pass over the roller, and to be discharged from the nozzle. The controller may also be configured to selectively activate the moveable support to move the nozzle in multiple dimensions during discharging, and selectively activate the cure enhancer to expose the matrix to a cure energy.

In yet another aspect, the present disclosure is directed to a method of additively manufacturing a composite structure. The method may include wetting at least one of a ribbon and a sheet of reinforcement with a matrix, and directing the at least one of the ribbon and the sheet of reinforcement over a roller. The method may further include discharging the at least one of the ribbon and the sheet of reinforcement from a nozzle, moving the nozzle in multiple dimensions during discharging, and directing cure energy toward the at least one of the ribbon and the sheet of reinforcement to cause the matrix to harden.

BRIEF DESCRIPTION OF THE DRAWINGS

FIGS. 2 and 3 are diagrammatic illustrations of an exemplary disclosed head that may be utilized

DETAILED DESCRIPTION

Figure 1:
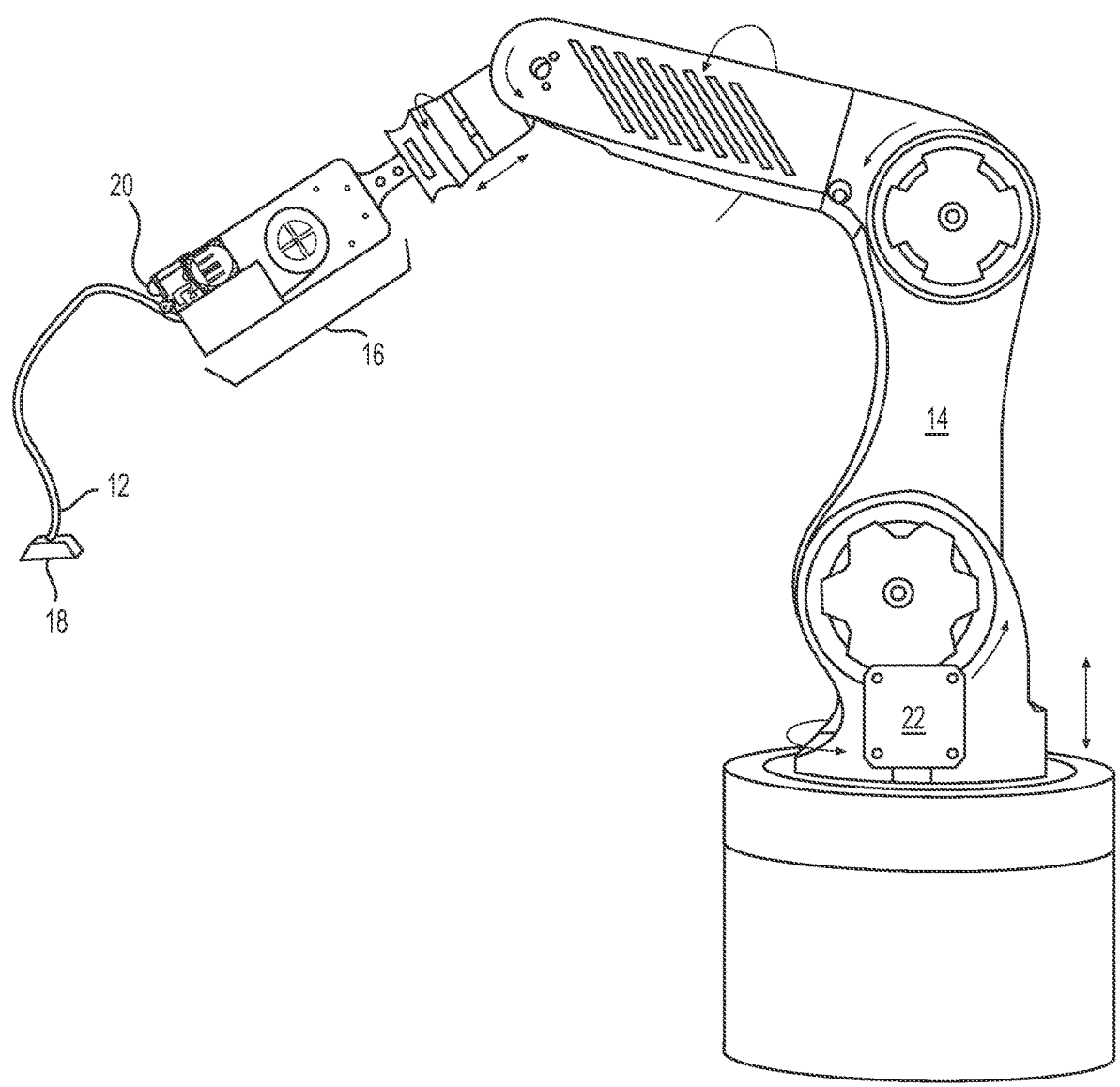
FIG. 1 is a diagrammatic illustration of an exemplary disclosed manufacturing system.

FIG. 1 illustrates an exemplary system 10, which may be used to continuously manufacture a composite structure 12 having any desired cross-sectional shape (e.g., circular, polygonal, etc.). System 10 may include at least a support 14 and a head 16. Head 16 may be coupled to and moved by support 14. In the disclosed embodiment of FIG. 1, support 14 is a robotic arm capable of moving head 16 in multiple directions during fabrication of structure 12, such that a resulting trajectory of material discharging from head 16 is three-dimensional. It is contemplated, however, that support 14 could alternatively be an overhead gantry or a hybrid gantry/arm also capable of moving head 16 in multiple directions during fabrication of structure 12. Although support 14 is shown as being capable of multi-axis movements, it is contemplated that any other type of support 14 capable of moving head 16 in the same or in a different manner could also be utilized, if desired. In some embodiments, a drive may mechanically couple head 16 to support 14, and may include components that cooperate to move and/or supply power or materials to head 16.

Head 16 may be configured to receive or otherwise contain a matrix. The matrix may include any type of material (e.g., a liquid resin, such as a zero-volatile organic compound resin; a powdered metal; etc.) that is curable. Exemplary matrixes include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix inside head 16 may be pressurized, for example by an external device (e.g., an extruder or another type of pump—not shown) that is fluidly connected to head 16 via a corresponding conduit (not shown). In another embodiment, however, the pressure may be generated completely inside of head 16 by a similar type of device. In yet other embodiments, the matrix may be gravity-fed through and/or mixed within head 16. In some instances, the matrix inside head 16 may need to be kept cool and/or dark to inhibit premature curing; while in other instances, the matrix may need to be kept warm for the same reason. In either situation, head 16 may be specially configured (e.g., insulated, chilled, and/or warmed) to provide for these needs.

The matrix may be used to coat, encase, or otherwise surround one or more ribbons and/or sheets of reinforcement and, together with the reinforcement, make up at least a portion (e.g., a wall) of composite structure 12. The reinforcement may be stored within or otherwise passed through head 16 (e.g., fed from external and/or internal spools 17—shown only in FIGS. 2 and 3). When multiple ribbons or sheets of reinforcement are simultaneously used, the reinforcements may be of the same type and have the same shape, size, and cross-section, or of a different type with different shapes, sizes, and/or cross-sections. The reinforcement may consist of, for example, carbon fibers, vegetable fibers, wood fibers, mineral fibers, glass fibers, metallic wires, optical tubes, etc. It should be noted that the term "reinforcement" is meant to encompass both structural and non-structural types of continuous ribbons or sheets of materials that can be at least partially encased in the matrix discharging from head 16.

The ribbons or sheets of reinforcement may be exposed to (e.g., coated with) the matrix while the reinforcements are inside head 16, while the reinforcements are being passed to head 16 (e.g., as a pre-preg material), and/or while the reinforcements are discharging from head 16, as desired. The matrix, dry reinforcements, and/or reinforcements that are already exposed to the matrix (e.g., wetted reinforcements) may be transported into head 16 in any manner apparent to one skilled in the art.

The matrix and reinforcement may be discharged from head 16 via at least two different modes of operation. In a first mode of operation, the matrix and reinforcement are extruded (e.g., pushed under pressure and/or mechanical force) from head 16, as head 16 is moved by support 14 to create the 3-dimensional shape of structure 12. In a second mode of operation, at least the reinforcement is pulled from head 16, such that a tensile stress is created in the reinforcement during discharge. In this mode of operation, the matrix may cling to the reinforcement and thereby also be pulled from head 16 along with the reinforcement, and/or the matrix may be discharged from head 16 under pressure along with the pulled reinforcement. In the second mode of operation, where the matrix-coated reinforcement is being pulled from head 16, the resulting tension in the reinforcement may increase a strength of structure 12, while also allowing for a greater length of unsupported material to have a straighter trajectory (i.e., the tension may act against the force of gravity to provide free-standing support for structure 12).

The reinforcement may be pulled from head 16, as a result of head 16 moving away from an anchor point 18. In particular, at the start of structure-formation, a length of matrix-impregnated reinforcement may be pulled and/or pushed from head 16, deposited onto anchor point 18, and cured, such that the discharged material adheres to anchor point 18. Thereafter, head 16 may be moved away from anchor point 18, and the relative movement may cause the reinforcement to be pulled from head 16. It should be noted that the movement of the reinforcement through head 16 could be assisted (e.g., via internal feed mechanisms), if desired. However, the discharge rate of the reinforcement from head 16 may primarily be the result of relative movement between head 16 and anchor point 18, such that tension is created within the reinforcement. It is contemplated that anchor point 18 could be moved away from head 16 instead of or in addition to head 16 being moved away from anchor point 18.

One or more cure enhancers (e.g., one or more light sources, an ultrasonic emitter, a laser, a heater, a catalyst dispenser, a microwave generator, etc.) 20 may be mounted proximate (e.g., within, on, and/or trailing from) head 16 and configured to enhance a cure rate and/or quality of the matrix as it is discharged from head 16. Cure enhancer 20 may be controlled to selectively expose external and/or internal surfaces of structure 12 to energy (e.g., light energy, electromagnetic radiation, vibrations, heat, a chemical catalyst or hardener, etc.) during the formation of structure 12. The energy may increase a rate of chemical reaction occurring within the matrix, sinter the matrix, harden the matrix, or otherwise cause the matrix to cure as it discharges from head 16.

A controller 22 may be provided and communicatively coupled with support 14, head 16, and any number and type of cure enhancers 20. Controller 22 may embody a single processor or multiple processors that include a means for controlling an operation of system 10. Controller 22 may include one or more general- or special-purpose processors or microprocessors. Controller 22 may further include or be associated with a memory for storing data such as, for example, design limits, performance characteristics, operational instructions, matrix characteristics, reinforcement characteristics, characteristics of structure 12, and corresponding parameters of each component of system 10. Various other known circuits may be associated with controller 22, including power supply circuitry, signal-conditioning circuitry, solenoid/motor driver circuitry, communication circuitry, and other appropriate circuitry. Moreover, controller 22 may be capable of communicating with other components of system 10 via wired and/or wireless transmission.

One or more maps may be stored in the memory of controller 22 and used during fabrication of structure 12. Each of these maps may include a collection of data in the form of models, lookup tables, graphs, and/or equations. In the disclosed embodiment, the maps are used by controller 22 to determine desired characteristics of cure enhancers 20, the associated matrix, and/or the associated reinforcements at different locations within structure 12. The characteristics may include, among others, a type, quantity, and/or configuration of reinforcement and/or matrix to be discharged at a particular location within structure 12, and/or an amount, intensity, shape, and/or location of desired compacting and curing. Controller 22 may then correlate operation of support 14 (e.g., the location and/or orientation of head 16) and/or the discharge of material from head 16 (a type of material, desired performance of the material, cross-linking requirements of the material, a discharge rate, etc.) with the operation of cure enhancers 20, such that structure 12 is produced in a desired manner.

An exemplary head 16 is disclosed in detail in FIGS. 2 and 3. Head 16 may include, among other things, a nozzle 26, and a matrix reservoir 28 disposed upstream of nozzle 26 (i.e., upstream relative to a travel direction of reinforcement through head 16). In this example, nozzle 26 is a single-path nozzle configured to discharge a composite ribbon or sheet having a generally rectangular cross-section. In some embodiments, a tip 44 of nozzle may be at least partially transparent. This may allow for energy from cure enhancers 20 to penetrate tip 44 and prime the curing of the matrix, as the composite material passes therethrough. It should be noted that the transparency of tip 44 may be selected so that the matrix is only primed for curing and does not cure while inside of nozzle 26. This may result in faster curing, once the material is fully exposed to the cure energy outside of tip 44.

Matrix reservoir 28 may be a generally enclosed structure, with one or more openings 30 formed at an upper end (i.e., upper with respect to gravity, when head 16 is in a normal printing orientation). In the disclosed embodiment, a single opening 30 is shown, allowing for dry reinforcement to be received from spool 17 at the same general location that wetted reinforcement is discharged toward nozzle 26. Matrix reservoir 28 may be configured to contain a bath of matrix, and a cross-sectional width of opening 30 may be narrower than an internal diameter of matrix reservoir 28 in order to limit spillage of the matrix bath during tilting of head 16. In the disclosed embodiment, matrix reservoir 28 may have a generally round or tear-drop cross-section, and taper radially inward to opening 30. This shape and taper may allow for tilting of head 16 to about 90° in a clockwise direction (referring to the orientation of FIG. 3) and past 90° (e.g., to about 120-150°) in the counterclockwise direction, without matrix spillage. It is contemplated that matrix reservoir 28 could be symmetrically designed, if desired, such that tilting in both directions past 90° (i.e., without spillage) may be possible. A size (e.g., diameter and/or height of an internal volume) of matrix reservoir 28 may be sufficient to hold a supply of matrix necessary for fully wetting reinforcements passing into nozzle 26.

One or more rollers 32 may be arranged within matrix reservoir 28 to help ensure adequate wetting of the reinforcement inside of matrix reservoir 28 and/or to reduce an amount of excess matrix clinging to the reinforcement before the reinforcement reaches nozzle 26. In the disclosed embodiment, three rollers 32 are utilized, including two wet rollers 32 that are submerged within the matrix and spaced apart laterally, and a single dry roller 32 that is located above an upper surface of the matrix. The submerged rollers 32 may function to push matrix into and/or distribute the reinforcement, while the subaerial roller 32 may oppositely function to wring out the reinforcement. The subaerial roller 32 may be positioned such that any excess matrix wrung out of the reinforcement is pulled by gravity back into matrix reservoir 28. It is contemplated that any number and arrangement of rollers (e.g., counterrotating and cooperatively arranged sets of rollers, a single submerged roller, etc.) may be utilized to perform these functions, as desired. It is also contemplated that any one or more of rollers 32 may be powered to rotate, and thereby feed the reinforcement through head 16.

As also shown in FIGS. 2 and 3, matrix reservoir 28 (along with rollers 32) may be disposed at least partially inside of a housing 34. Housing 34 may be provided to shroud matrix reservoir 28 and rollers 32 from external energy sources (e.g., from cure enhancers 20) that could cause the matrix therein to prematurely cure and stick to internal surfaces of head 16. Housing 34 may include, among other things, a removeable end cap 36 (removed in FIG. 3), which provides access to matrix reservoir 28 (e.g., for filling purposes), rollers 32 (e.g., for threading purposes), and an internal cavity of nozzle 26 (e.g., for clearing purposes). It should be noted that, although housing 34 is shown in FIG. 3 as being generally cuboid and including a single low-clearance inlet 38, housing 34 could have another configuration. Head 16 may be connected to support 14 (referring to FIG. 1) by way of housing 34, if desired.

Multiple cure enhancers 20 are shown in FIGS. 2 and 3 as being arranged in a line at a trailing side of nozzle 26. In some embodiment, a heatsink 40 is associated with cure enhancers 20, and one or more fans 42 (shown as partially transparent in FIG. 2, for clarity) may be connected to heat sink 40 (e.g., via threaded fasteners—not shown) to move excess heat generated by cure enhancers 20 into the environment. In the disclosed embodiment, two fans 42 are shown at opposing ends of heat sink 40. It is contemplated, however, that any number of fans 42 may be utilized to move air across heat sink 40 and/or that heat sink 40 may alternatively use water, oil, or another fluid for cooling purposes. Fans 42 may blow and/or draw air in any direction through heat sink 40.

In some applications, the energy from cure enhancers 20 may need to be aimed and/or focused. In these applications, one or more adjustable optics 45 may be associated with one or more of cure enhancers 20. Optics 45 may be adjustable (e.g., manually and/or automatically) to move closer to or further away from cure enhancers 20. For example, each optic 45 may be mounted at the end of a standoff pipe 46, and the length of standoff pipe 46 may be changeable. In addition, each optic 45 may be configured to pivot about one or more axes of standoff pipe 46, allowing the energy passing through optic 45 to be aimed and/or for optic 45 to be complete removed from a path of the energy.

Exposure to cure energy from cure enhancers 20 may allow for the composite material discharging from nozzle 26 to cure in free space and/or to be layered on top of previously discharged material. When layered on top of previously discharged material, in some applications, the newly discharge material may need to be compressed down onto the previously discharged material to ensure adequate adhesion between the layers and/or to provide for a desired surface shape and/or texture of the new material. This can be accomplished, for example, via a compactor 48.

Compactor 48 may include, among other things, a compacting wheel 50 that is biased against the matrix-coated reinforcement via one or more springs 52. In the disclosed embodiment, compacting wheel 50 is generally cylindrical, with one compression-type coil spring 52 located at each opposing end. It should be noted, however, that any number and type of springs 52 may be utilized. Spring(s) 52 may exert a constant or variable force on compacting wheel 50, as desired.

Figure 4:
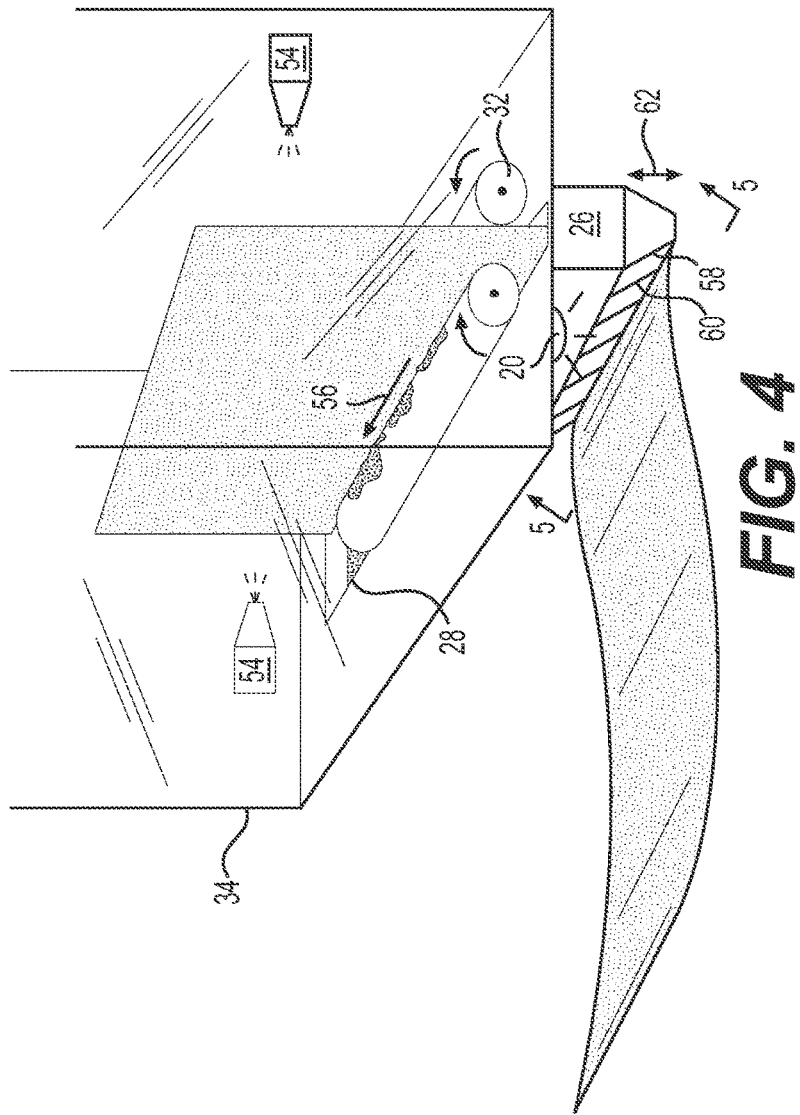
FIGS. 4 and 5 are diagrammatic illustrations of another exemplary disclosed head that may be utilized with the manufacturing system of FIG. 1.

Another configuration of head 16 is illustrated in FIG. 4. Unlike the circuitous reinforcement route provided through the matrix bath of FIGS. 2 and 3, the reinforcement may follow a more direct and axial path through head 16 of FIG. 4. For example, the reinforcement may be passed directly from spool 17 (shown only in FIGS. 2 and 3) in a generally straight-line trajectory through nozzle 26. While passing through housing 34 (shown as transparent in FIG. 4, for clarity), one or more matrix jets 54 (e.g., at least one matrix jet 54 located at each side of the associated ribbon or sheet of reinforcement) may spray the reinforcement with matrix. This spraying of reinforcement may function to separate individual fibers, such that a deep penetration of the matrix into the reinforcement may occur. In addition, matrix jets 54 may allow for precise control over an amount of matrix that coats the reinforcement.

At least one set of counterrotating and opposing rollers 32 may be located between matrix jets 54 and nozzle 26, to help press matrix into and/or wring excess matrix out of the reinforcement. Rollers 32, in the embodiment of FIG. 4, may be angled toward matrix reservoir 28, such that excess matrix pooling on rollers 32 may flow in the direction of an arrow 56 and be collected within matrix reservoir 28 that is located at an end of rollers 32. In one embodiment, jet(s) 54 may function to draw matrix from reservoir 28 for spraying onto the reinforcement. In another embodiment, jet(s) 54 may draw matrix from another source, and the matrix collected within reservoir 28 may simply be discarded.

Figure 5:
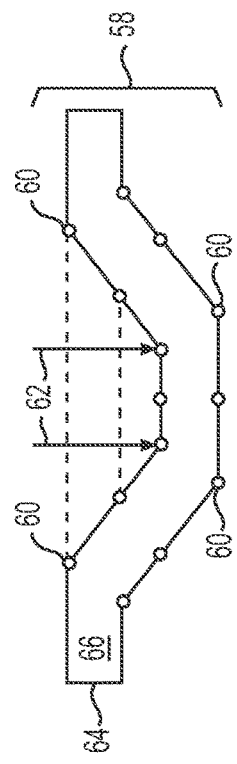

In one embodiment, nozzle 26 of head 16 may include unique features that cooperate to accommodate multi-dimensional print surfaces and/or to produce multi-faceted structures 12. For example, FIG. 5 shows nozzle 26 as being flexible and allowed to contort away from of a straight-line configuration. In this example, nozzle 26 may be provided with a multi-part tip 58; wherein the different parts of tip 58 are pivotally connected to each other (e.g., via hinges 60). This may allow for pivoting of the different parts of tip 58 relative to each other, as well as the linear raising and lowering relative to each other. When head 16 travels orthogonally relative to the print surface (see, for example, FIG. 4), the linear raising and/or lowering of the tip parts may allow for the print surface to have a corrugated texture. When head 16 travels axially relative to a print surface (not shown), the pivoting of the tip parts may allow for fabrication of a C-, V-, and/or S-shaped cross-sections of structure 12.

One or more actuators 62 (e.g., linear and/or rotary actuators) may be associated with tip 58 and configured to automatically adjust the configuration of tip 58 when selectively energized by controller 22 (referring to FIG. 1). These adjustments may include relative pivoting of the tip parts and/or raising-and-lowering, as desired. For example, controller 22 may selectively energize actuators 62 based on specifications for structure 12 that are stored in memory and/or in coordination with movements of head 16 caused by support 14. In one embodiment, the adjustments may be implemented to create particular facets of structure 12. In another embodiment, the adjustments may be implemented to discharge material on top of an irregular print surface.

It is contemplated that nozzles 26 may additionally or alternatively be moveable based only on interaction with a print surface (e.g., without the use of any actuators 62), if desired. For example, the tip parts may be biased (e.g., via a spring or hydraulic pressure) to a baseline position, and moveable away from the baseline position when printing over an uneven surface.

In one embodiment, tip 58 includes a flexible outer membrane 64 that may be filled with a smart fluid (e.g., a magnetorheological fluid) 66 that, when energized (e.g., when exposed to a magnetic field or a voltage potential), increases in viscosity and can even become a solid. Controller 22 may selectively de-energize the fluid to relax membrane 64 during movements of actuator(s) 62, and thereafter re-energize the fluid such that membrane 64 again becomes rigid in the new configuration caused by the movement of actuator(s) 62. In this manner, membrane 64 may help to provide consistent contour control during fabrication of structure 12.

Figure 6:
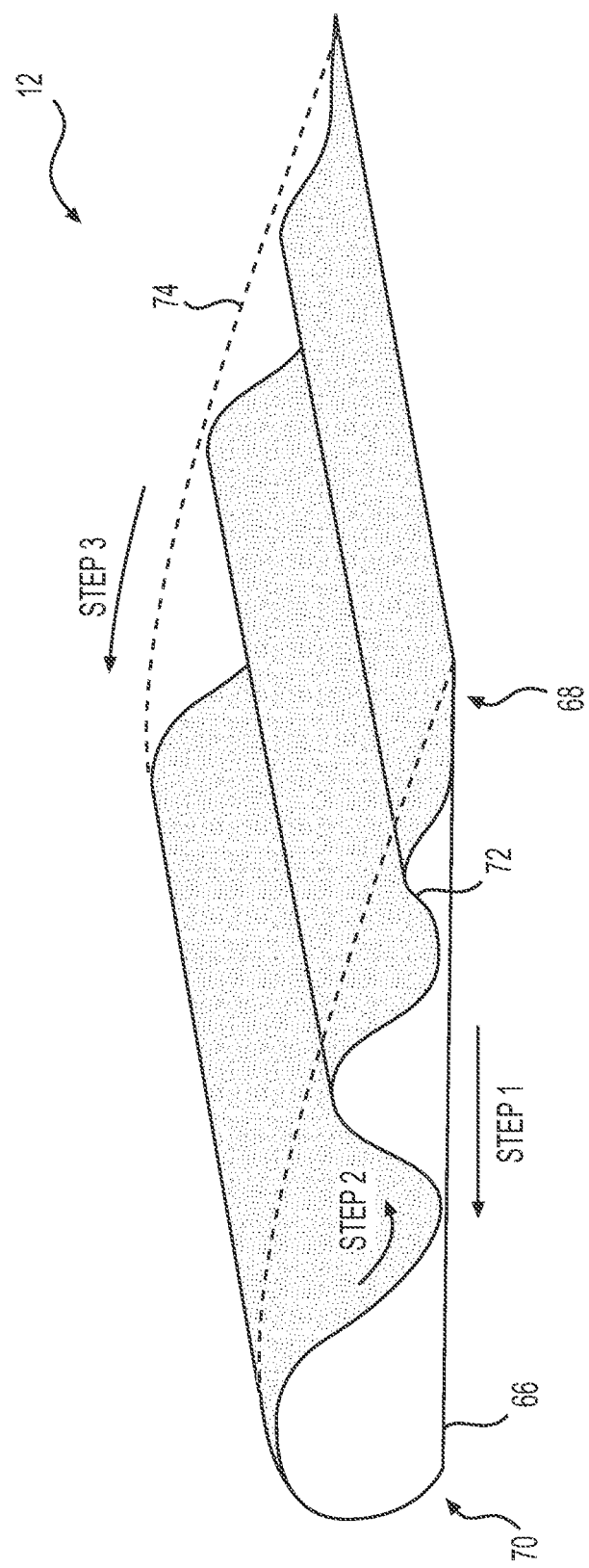
FIG. 6 is a diagrammatic illustration of an exemplary disclosed process that may be performed by the system of FIG. 1 and the head of FIGS. 2-5.

FIG. 6 illustrates an exemplary structure 12 that may be fabricated via any of the disclosed head embodiments. FIG. 6 will be discussed in more detail in the following section to further illustrate the disclosed concepts.

INDUSTRIAL APPLICABILITY

The disclosed system may be used to continuously manufacture composite structures having any desired cross-sectional size, shape, length, density, and/or strength. The composite structures may include any number of different ribbon and/or sheet type reinforcements of the same or different thicknesses, shapes, sizes, configurations, and consists, each coated with a common matrix. In addition, the disclosed heads may allow fabrication of complex structures via adjustable nozzle tips. Operation of system 10 will now be described in detail.

At a start of a manufacturing event, information regarding a desired structure 12 may be loaded into system 10 (e.g., into controller 22 that is responsible for regulating operations of support 14 and/or head 16). This information may include, among other things, a size (e.g., diameter, wall thickness, length, etc.), a contour (e.g., a trajectory), surface features (e.g., ridge size, location, thickness, length; flange size, location, thickness, length; etc.), connection geometry (e.g., locations and sizes of couplings, tees, splices, etc.), desired weave patterns, weave transition locations, location-specific matrix stipulations, location-specific reinforcement stipulations, density stipulations, etc. It should be noted that this information may alternatively or additionally be loaded into system 10 at different times and/or continuously during the manufacturing event, if desired. Based on the component information, one or more different ribbons and/or sheets of reinforcement and/or matrix may be selectively installed and/or continuously supplied into system 10.

Installation of the reinforcement may be performed by passing the ribbon(s) and/or sheet(s) down through housing 34 (and through the matrix bath of reservoir 28 in the embodiment of FIGS. 2 and 3), and then threading the reinforcement through nozzle 26. Installation of the matrix may include filling head 16 (e.g., matrix reservoir 28) and/or coupling of an extruder (not shown) to head 16 (e.g., to jet(s) 54). Head 16 may then be moved by support 14 under the regulation of controller 22 to cause matrix-coated reinforcements to be placed against or on a corresponding anchor point 18. Cure enhancers 20 may then be selectively activated to cause hardening of the matrix surrounding the reinforcements, thereby bonding the reinforcements to anchor point 18.

The component information may then be used to control operation of system 10. For example, the reinforcements may be pulled and/or pushed from head 16 (along with the matrix), while support 14 selectively moves head 16 in a desired manner during curing, such that an axis of the resulting structure 12 follows a desired trajectory (e.g., a free-space, unsupported, 3-D trajectory). As the matrix-coated ribbon(s) and/or sheet(s) of reinforcement are pulled through head 16, the reinforcement may pass through nozzle 26 and under compactor 48, prior to full exposure by cure enhancers 20. Actuator(s) 62 may be selectively energized by controller 22, such that the continuous ribbon(s) or sheet(s) of material have a desired cross-sectional shape and/or outer contour. Once structure 12 has grown to a desired length, structure 12 may be disconnected (e.g., severed) from head 16 in any desired manner.

In one embodiment, structure 12 may be fabricated via a continuous toolpath of head 16 to have opposing layers of external skin and an intermediate support. For example, a monolithic airfoil may be created with the continuous toolpath.

To fabricate the airfoil, a lower surface 66 may first be created. Lower surface 66 may be generally flat, concave, convex, or have another shape, and may be created by discharging the ribbon(s) or sheet(s) of composite material during movement of head 16 from a trailing edge 68 toward a leading edge 70 in a generally linear fashion (Step 1). It is contemplated that the material discharged during completion of Step 1 may be cured in free space or, alternatively laid over a flat surface or curved mold, as desired. Without interrupting operation of head 16, upon reaching leading edge 70, head 16 may be controlled to continue discharging the ribbon or sheet of composite material during a return from leading edge 70 back toward trailing edge 68 following an undulating motion (Step 2). It should be noted that valleys in the composite material created by the undulating motion of head 16 may bond during curing to an internal face of lower surface 66. It is contemplated that any number of valleys may be formed during Step 2, and the composite material discharged during the undulating motion of head 16 may function as an internal skeleton or intermediate support 72 of the airfoil. Upon reaching trailing edge 68, and without interruption, head 16 may be controlled to continue discharging the ribbon or sheet of composite material during another pass from trailing edge 68 back toward leading edge 70 following a generally arcuate trajectory (Step 3). The composite material discharged during completion of Step 3 may function as an upper surface 74 (shown as transparent, for purposes of clarity) of the airfoil. It should be noted that an internal face of upper surface 74 may bond during curing to peaks in the composite material created by the undulating motion of head 16 during Step 2.

It is contemplated that the steps described above could be completed in a different order; that some or all of the steps may be repeated to form thicker surfaces and/or intermediate supports; and/or that additional steps could be used to fabricate the airfoil, if desired. For example, Steps 1 and 3 could be interchanged. Alternatively, intermediate support 72 could be created first, followed by creation of lower and then upper (or vice versa) surfaces 66, 74. Finally, more than one pass may be used to create a desired density and/or strength within intermediate support 72. Other modifications and/or changes may also be possible. Using this process, the airfoil may be created quickly and with any required density and/or strength in a lightweight configuration.

It will be apparent to those skilled in the art that various modifications and variations can be made to the disclosed system, heads, and/or structures. Other embodiments will be apparent to those skilled in the art from consideration of the specification and practice of the disclosed system and/or heads. It is intended that the specification and examples be considered as exemplary only, with a true scope being indicated by the following claims and their equivalents.

What is claimed is:

1. A head for an additive manufacturing system, comprising:
a housing;
a matrix reservoir disposed inside of the housing;
at least one roller located inside of the housing and configured to engage at least one of a ribbon and a sheet of reinforcement passing through the head;
a nozzle fluidly connected to the matrix reservoir; and
at least one cure enhancer located outside of the housing and adjacent the nozzle,
wherein an axis of the at least one roller is angled toward the matrix reservoir such that matrix clinging to the at least one roller is pulled by gravity into the matrix reservoir.

2. The head of claim 1, further including at least one matrix jet located inside the housing and configured to spray matrix against the at least one of the ribbon and the sheet of reinforcement.

3. The head of claim 2, wherein the at least one matrix jet is configured to receive matrix from the matrix reservoir.

4. The head of claim 1, wherein the nozzle includes an adjustable multi-part tip configured to generate different shapes within discharge from the nozzle.

5. The head of claim 1, wherein the nozzle includes a transparent tip.

6. The head of claim 1, further including an elongated compactor configured to compress the at least one of the ribbon and the sheet of reinforcement after discharge from the nozzle.

7. The head of claim 6, wherein the at least one cure enhancer includes a plurality of cure enhancers arranged in a line at a side of the elongated compactor opposite the nozzle.

8. The head of claim 7, wherein the housing is configured to support the plurality of cure enhancers and the elongated compactor.

9. The head of claim 8, further including a spool mounted inside of the housing, the spool being configured to supply the at least one of the ribbon and the sheet of reinforcement to the matrix reservoir.

10. An additive manufacturing system, comprising:
a moveable support;
a matrix reservoir connected to an end of the moveable support;
at least one roller associated with the matrix reservoir;
a nozzle and
a cure enhancer located adjacent the nozzle; and
a processor in communication with the moveable support and the cure enhancer,
wherein:
the additive manufacturing system is configured to:
receive at least one of a ribbon and a sheet of reinforcement into the matrix reservoir to wet the at least one of the ribbon and the sheet of reinforcement with a matrix;
pass the at least one of the ribbon and the sheet of reinforcement over the at least one roller after wetting;
discharge the at least one of the ribbon and the sheet of reinforcement and the matrix from the nozzle;
wherein the matrix reservoir comprises a single opening through which the at least one a ribbon and a sheet of reinforcement is both received and discharged, wherein the single opening has a diameter smaller than an internal diameter of the matrix reservoir; and
the processor is configured to:
activate the moveable support to move the nozzle in multiple dimensions during discharging; and
activate the cure enhancer to expose the matrix wetting the at least one of the ribbon and the sheet of reinforcement to a cure energy during discharging.

11. The additive manufacturing system of claim 10, wherein the at least one roller is submerged inside of the matrix reservoir during operation of the additive manufacturing system.

12. The additive manufacturing system of claim 11, further including a subaerial roller located over the single opening of the matrix reservoir and configured to wring matrix out of the at least one of the ribbon and the sheet of reinforcement.

13. The additive manufacturing system of claim 10, further including an elongated compactor configured to compress the at least one of the ribbon and the sheet of reinforcement after discharge from the nozzle.

14. A head for an additive manufacturing system, comprising:
- a housing;
- a reservoir disposed inside of the housing and configured to wet at least one of a ribbon and a sheet of a continuous reinforcement with a liquid matrix, the reservoir having a teardrop cross-section and single opening through which the at least one of a ribbon and a sheet of reinforcement is both received and discharged;
- a discharge outlet connected to receive the at least one of a ribbon and a sheet of continuous reinforcement; and
- at least one cure enhancer located adjacent the discharge outlet and configured to expose the liquid matrix wetting the at least one of the ribbon and the sheet of reinforcement to a cure energy.

15. The head of claim 14, wherein the single opening has a diameter smaller than an internal diameter of the reservoir.

16. The head of claim 14, further including at least one roller submerged inside of the reservoir and configured to support the at least one of the ribbon and the sheet of reinforcement during wetting with the liquid matrix.

17. The head of claim 16, further including a subaerial roller located over the single opening of the reservoir.

18. The head of claim 14, wherein:
- the head further includes an elongated compactor configured to compress the at least one of the ribbon and the sheet of reinforcement after discharge from the discharge outlet; and
- the at least one cure enhancer includes a plurality of cure enhancers arranged in a line at a side of the elongated compactor opposite the discharge outlet.

19. The head of claim 10, wherein the matrix reservoir has a teardrop cross-section.

* * * * *